B. D. HORTON.
SERVICE AND METER TEST SYSTEM AND ASSOCIATED APPARATUS.
APPLICATION FILED MAR. 28, 1919.
1,338,180. Patented Apr. 27, 1920.
8 SHEETS—SHEET 1.
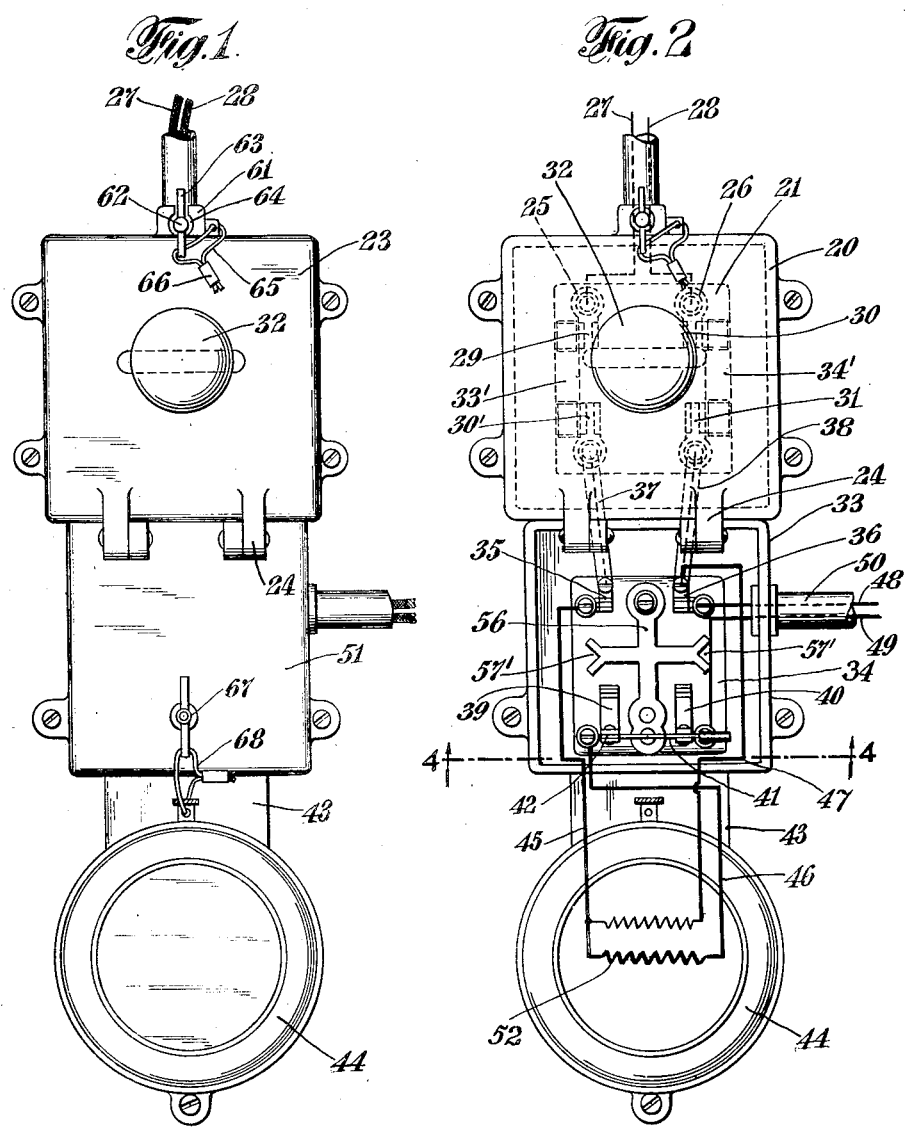
INVENTOR
Bryson D. Horton
By
ATTORNEY B. D. HORTON.
SERVICE AND METER TEST SYSTEM AND ASSOCIATED APPARATUS.
APPLICATION FILED MAR. 28, 1919.
1,338,180.
Patented Apr. 27, 1920.
8 SHEETS—SHEET 2.
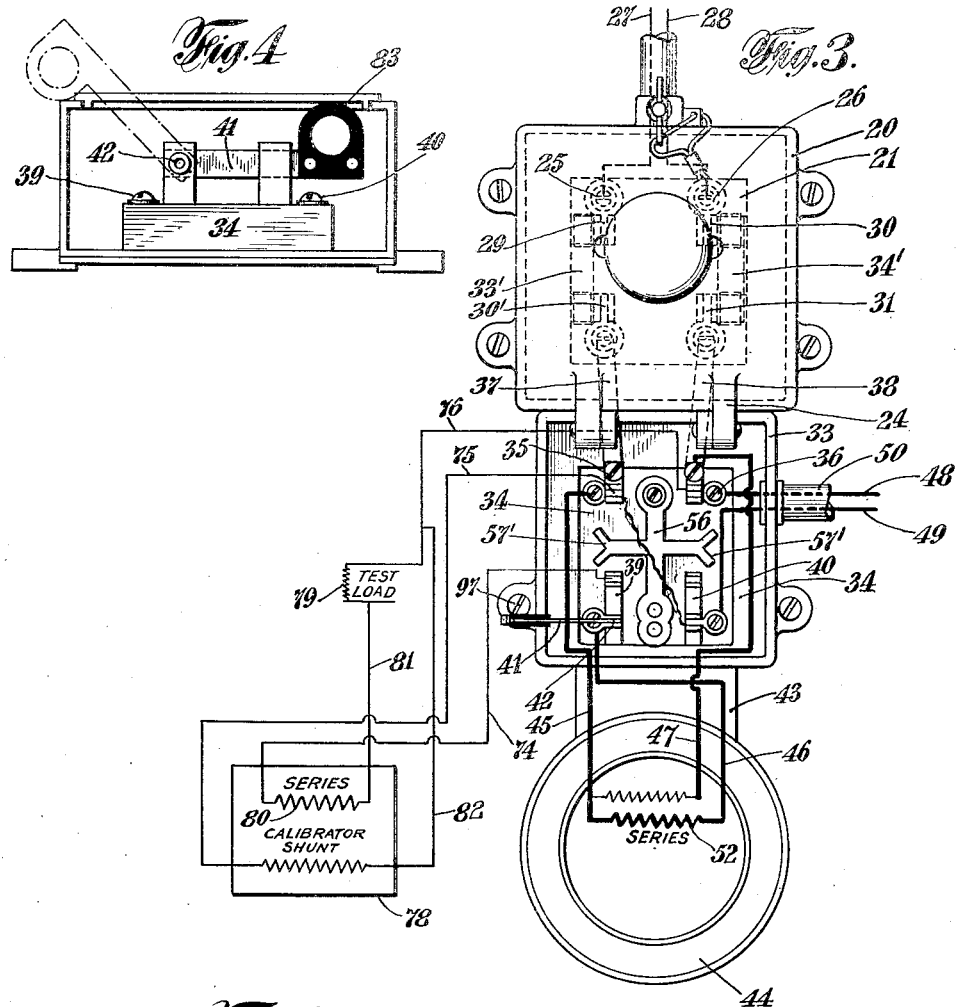
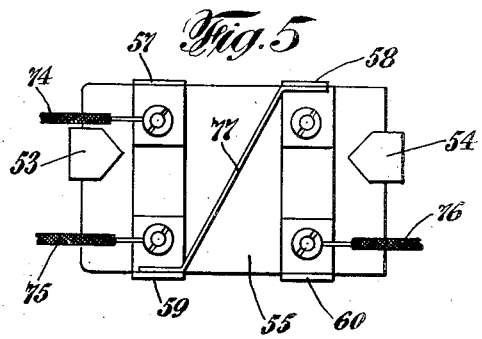
INVENTOR
Bryson D. Horton
By
ATTORNEY B. D. HORTON.
SERVICE AND METER TEST SYSTEM AND ASSOCIATED APPARATUS.
APPLICATION FILED MAR. 28, 1919.
1,338,180. Patented Apr. 27, 1920.
8 SHEETS—SHEET 3.
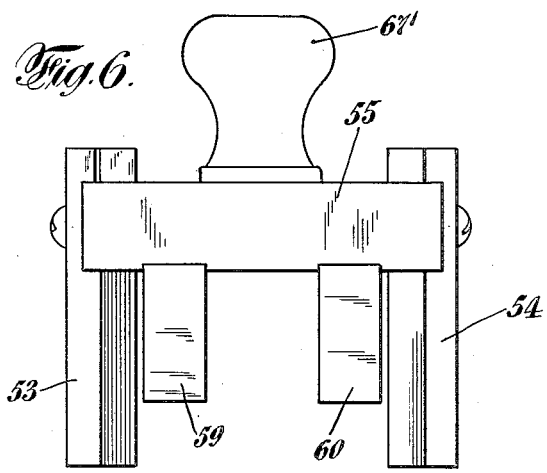
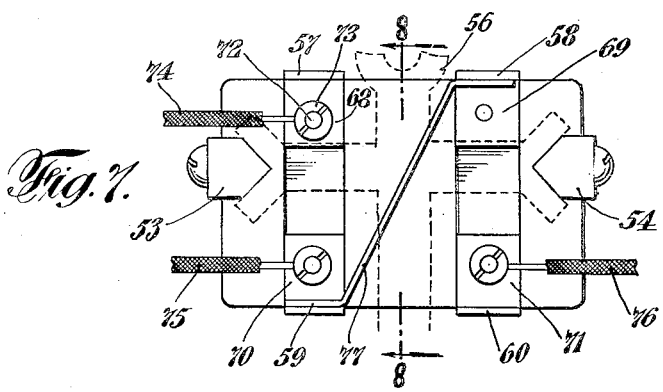
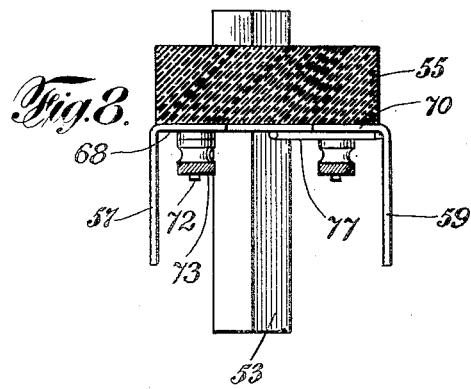
INVENTOR
Bryson D. Horton
By
ATTORNEY

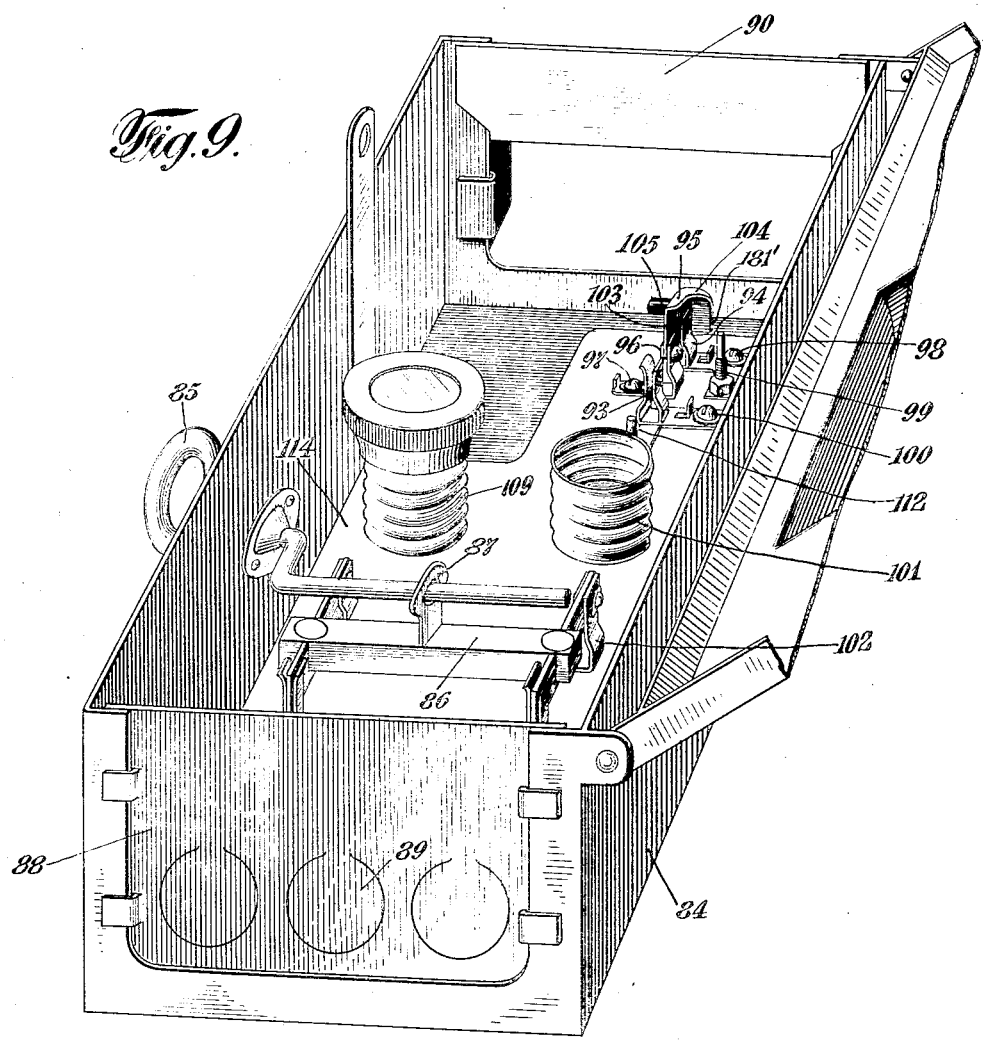

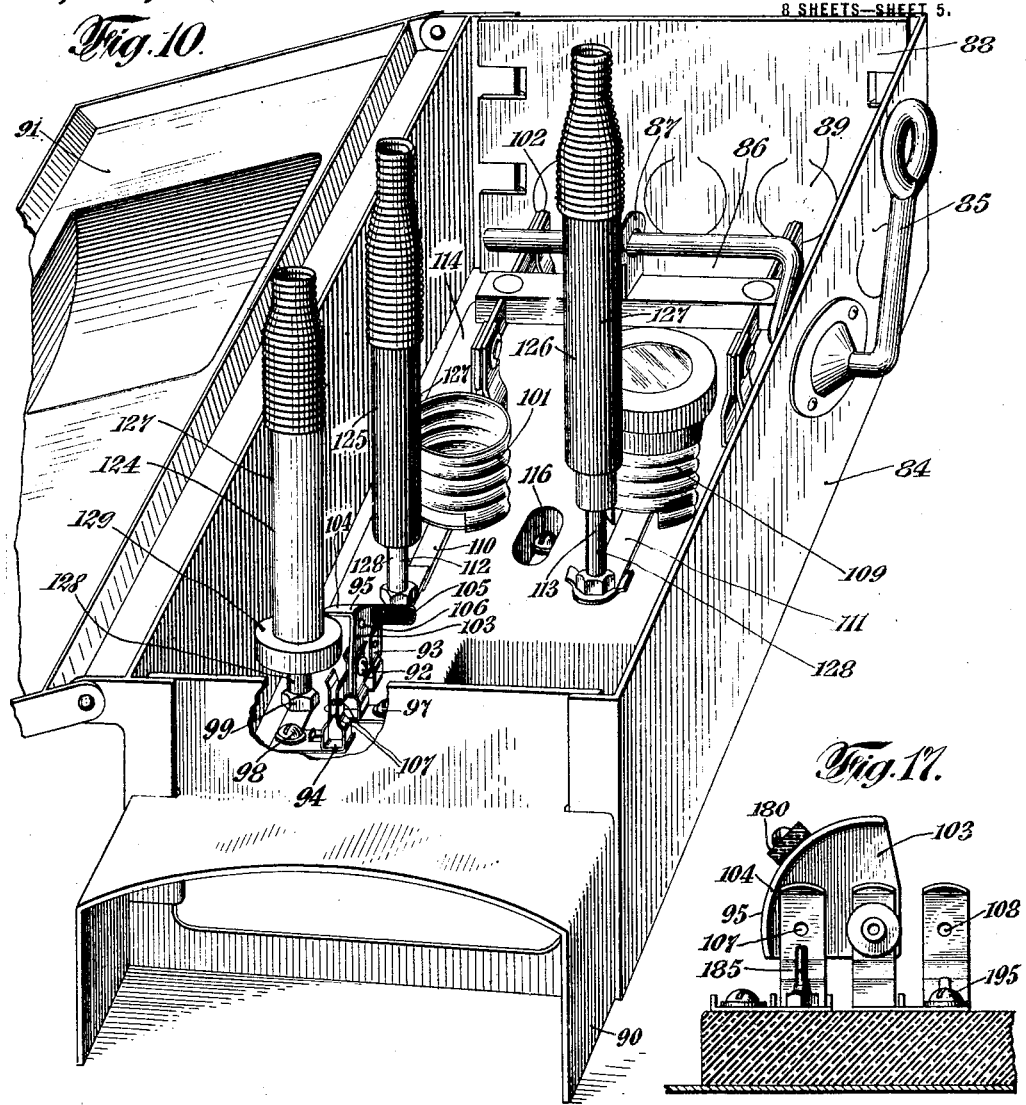

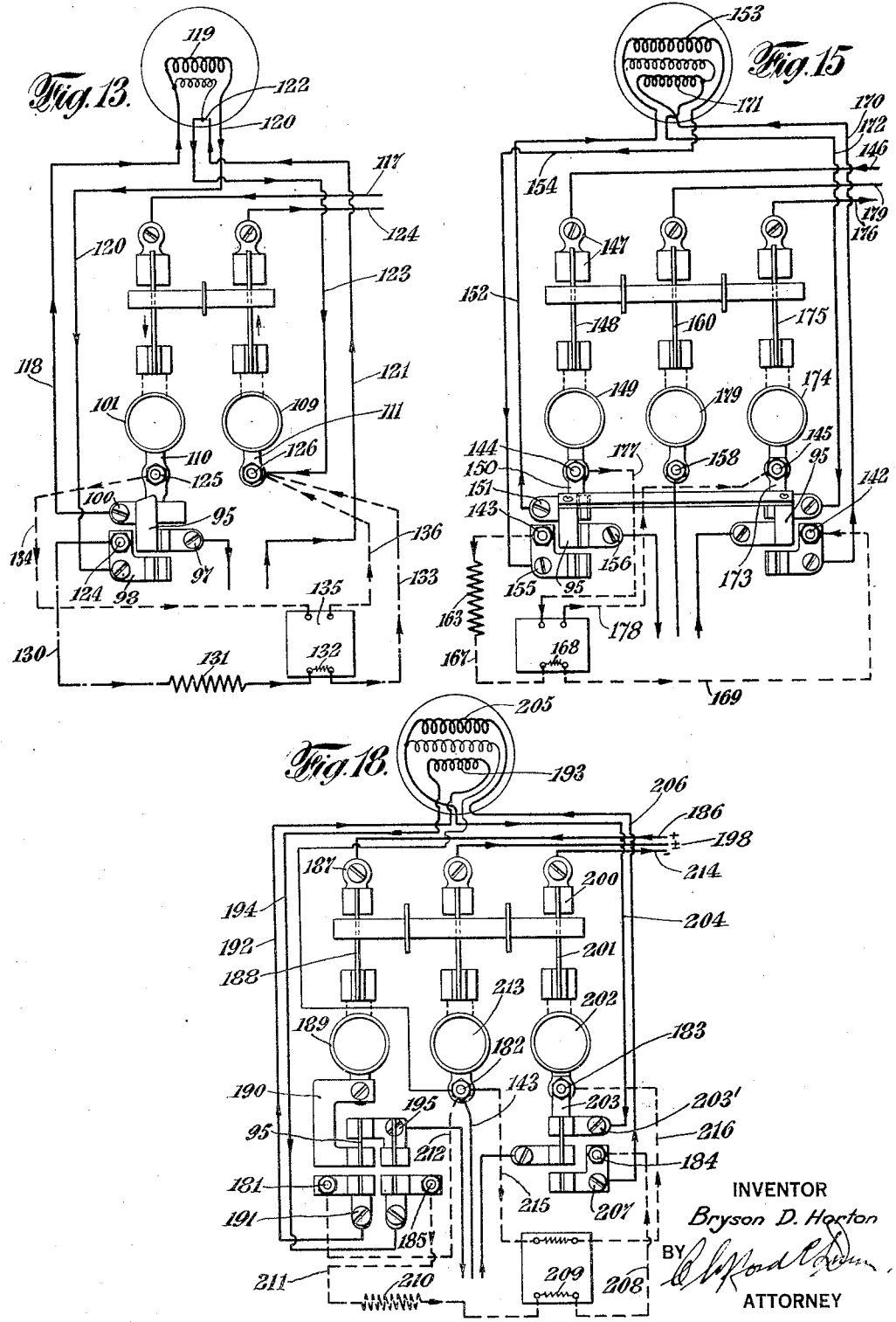

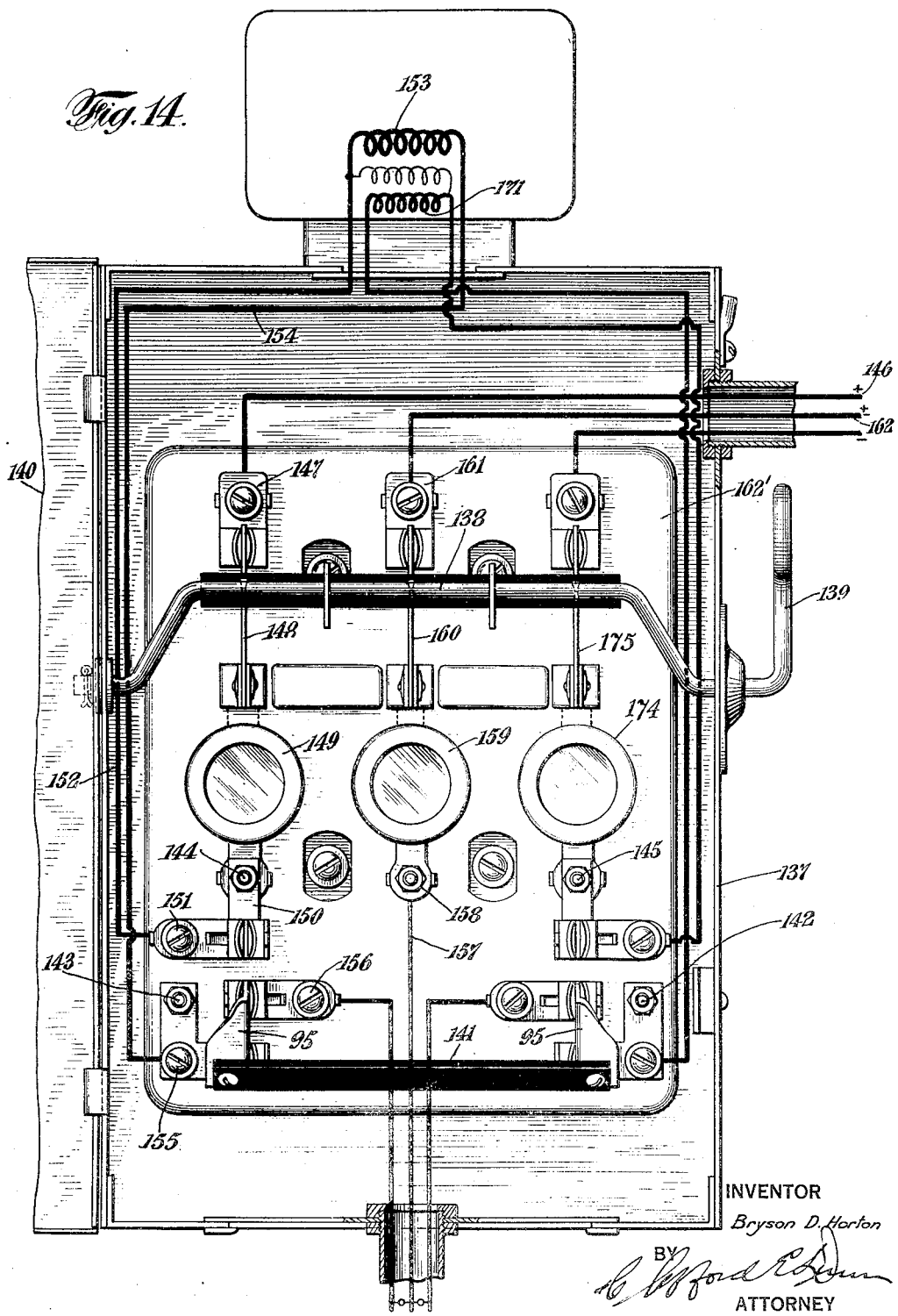

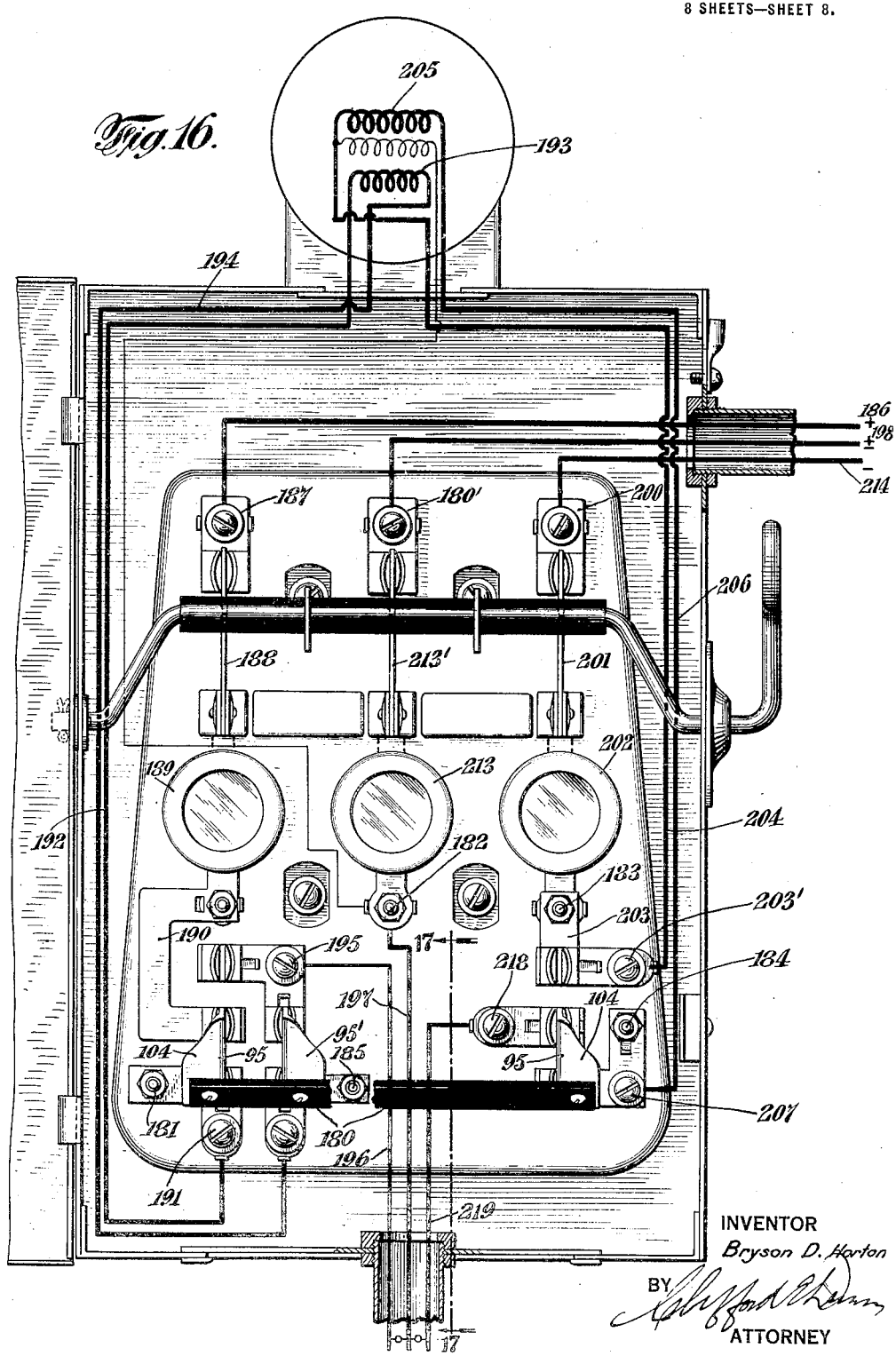

UNITED STATES PATENT OFFICE.

BRYSON D. HORTON, OF DETROIT, MICHIGAN.

SERVICE AND METER-TEST SYSTEM AND ASSOCIATED APPARATUS.

1,338,180.  Specification of Letters Patent.  Patented Apr. 27, 1920.

Continuation in part of applications Serial No. 762,773, filed April 22, 1913, and Serial No. 879,481, filed December 29, 1914. This application filed March 28, 1919. Serial No. 285,856.

*To all whom it may concern:*

Be it known that I, BRYSON D. HORTON, a citizen of the United States, residing at Detroit, in the county of Wayne and State of Michigan, have invented certain new and useful Improvements in Service and Meter - Test Systems and Associated Apparatus, of which the following is a full, clear, and concise description.

This invention relates to improved circuits and apparatus for service and meter test systems and associated apparatus, and more particularly to improved circuit controlling apparatus and improved means for interconnecting and associating said apparatus to obtain simplified and more efficient switching, and adequate together with proper protection for said apparatus and wiring to prevent unauthorized tampering therewith.

In so far as concerns common subject matter, this application is a continuation of my co-pending applications, Serial No. 762,773 filed April 22, 1913, and entitled "Electrical switches and test devices," and Serial No. 879,481 filed December 29, 1914, entitled "Electrical switches."

The principal requisites of a service and test meter system reside in the production of means whereby the service circuit can be quickly switched from the service condition to the meter test condition. In this switching operation, according to the best commercial practice, the service meter is disconnected from the load circuit and this switching should be accomplished without interrupting the connection between the service and load circuits. When the normal service circuit is thus converted to the test condition, with the service meter disconnected from the load, the power applied to the consumer is not measured. It is therefore very essential that the circuit be restored to the original service condition as soon as the meter has been tested. Likewise it is important to inclose the apparatus and the interconnecting wiring used for the service and test switching circuits, in an adequate protective housing whereby the probability of tampering with the apparatus and wiring by unauthorized individuals, will be reduced to a minimum, thereby reducing the possibility of theft.

It is one of the objects of this invention, therefore, to provide a service and meter testing circuit and associated apparatus inclosed in an adequate protective housing and which are provided with improved means for a quick, simple and expeditious switching of the circuit from the service to the test condition, and vice versa.

Another object of this invention consists in the provision of improved test switching means interposed between the service switch and the load, the said switching means being adapted to carry and properly interrupt the complete load current.

A further object of the invention consists in the production of improved means for inclosing service and meter test apparatus and interconnecting wiring, in a protective housing, inaccessible to unauthorized individuals, and with which means are provided externally of said housing and always accessible, for controlling the connection between the service and load circuits.

An additional object of the invention resides in the production of improved means whereby the inclosure must be opened to conduct a meter test and improved means which will necessitate the switching of the test meter into the normal service circuit from the test circuit before the said protective inclosure for said circuits and apparatus can be closed.

Further objects of the invention will become apparant from the following description and the appended claims.

For the purposes of description, several embodiments of this invention are illustrated in the accompanying drawings, in which:

Figure 1 illustrates in front elevation the service switch and testing device inclosure, together with a meter, the meter and the service switch and testing device inclosure being combined in a protective structure for the associated apparatus and interconnecting wiring;

Fig. 2 is a front elevation of the inclosure illustrated in Fig. 1, with the cover removed, and shows the service switch and meter-testing switching apparatus positioned within said inclosure, and the service circuit indicated diagrammatically;

Fig. 3 is a view similar to Fig. 2 with the test meter circuits diagrammatically included;

Fig. 4 is a section taken on the plane indicated by the line 4—4 of Fig. 2, looking in the direction of the arrows, of the meter test apparatus inclosure;

Fig. 5 is a bottom plan view of the test plug by means of which the test connections are made;

Fig. 6 is a side view of the test plug, showing the positioning keys employed to facilitate the centering of the plug and assure proper interconnection between the plug and its coöperating fixed testing apparatus;

Fig. 7 is a bottom plan view of the test plug showing the operative position of the keys and the grooved barrier;

Fig. 8 is a detail of the test plug, taken on the plane represented by the line 8—8 of Fig. 7, looking in the direction of the arrows;

Fig. 9 is an illustration in perspective of a two-wire service switch inclosure, comprising the service switch and the necessary apparatus for making the testing connections, the apparatus as shown in this figure being in service condition;

Fig. 10 is an illustration in perspective taken from the opposite end of the inclosure to that shown in Fig. 9, showing the apparatus there illustrated in test condition;

Fig. 11 is a view, partly in section, looking down at the upper end of the meter load disconnecting switch, with the switch in test condition as shown in Fig. 10.

Fig. 12 is a wiring diagram of a two-wire circuit of the apparatus shown in Figs. 9 and 10, in service condition;

Fig. 13 is a similar wiring diagram with the apparatus in test condition;

Fig. 14 is a plan view of a protective inclosure for a meter, a service switch and testing apparatus, and illustrates the apparatus necessary with a three-wire circuit for testing with the two current coils of the meter in series across the negative and positive line terminals of a three-wire circuit, the apparatus as shown in the diagram being positioned in service condition;

Fig. 15 is a wiring diagram showing the apparatus illustrated in Fig. 14 switched to the test condition;

Fig. 16 is a plan view of a protective switch inclosure for a three-wire circuit equipped with service switch and meter testing apparatus, the testing apparatus being arranged to test the meter coils in series from one side of the line to the neutral wire, the apparatus as shown in this figure being connected in the service condition;

Fig. 17 is a section taken on the plane represented by the line 17—17 of Fig. 16, looking in the direction of the arrows; and Fig. 18 is a wiring diagram showing the apparatus illustrated in Fig. 16 in test condition.

Referring now in detail to the embodiment illustrated in Figs. 1 to 4 inclusive, it will be noted that the housing or inclosure 20, carries an insulating base 21, and is fitted with a cover 23 hinged at 24. Mounted upon the base 21 are the service line terminals 25 and 26, to which are attached the service conductors 27 and 28. The line terminals 25 and 26 also carry the switch contact clips 29 and 30; and positioned on the opposite end of the insulating base 21 are the coöperating switch contact clips 30' and 31 respectively. The switch contact clips 29 and 30' respectively and 30 and 31 respectively, are bridged by the movable portion of a switching mechanism operated by the handle 32, which mechanism is supported on the hinged cover 23 of the receptacle, and consists of conventional switch blades and protecting fuses 33' and 34', shown in broken lines in Figs. 2 and 3.

Mounted directly beneath the service switch inclosure 20 is the inclosure 33 carrying the testing apparatus. This apparatus consists of an insulating base 34 mounted on the bottom of the housing 33, said insulating base 34 being equipped with the terminal clip contacts 35 and 36, to which are secured the contact bars 37 and 38, which are carried through an opening interconnecting the housings 20 and 33, to the service switch contact clip terminals 30' and 31. Secured to the lower end of the insulating block 34 are the terminal clip contacts 39 and 40, the clip contacts 39 and 40, together with the switch blade 41, constituting what may be called either a load controlling or preferably a meter load disconnecting switch. The blade 41 is pivoted to the clip contact 39 at 42 and coöperates with suitable clip contacts in the terminal clip contact 40. Connected to the housing 33 by a suitable meter adapter 43 is any type of an electric meter 44 of usual and well known construction. The meter is electrically connected with the testing switch by means of the wires 45, 46 and 47, these wires all being carried through the meter adapter 43 and completely inclosed in the protective inclosure.

The consumer's load is connected to the conductors 48 and 49 and is carried in to the inclosure 33 through a suitable opening in the wall of the inclosure, with which is preferably interconnected a conduit such as 50. A suitable cover or lid 51 is fitted over the inclosure 33 and locked and sealed in place as hereinafter to be described.

In the embodiment of the invention illustrated in Figs. 1, 2 and 3, the service switch and meter test inclosing housing are shown as individual and separate parts, but obviously these parts could readily be combined into one inclosure, capable of receiving all the apparatus associated with the service circuit as well as the switching circuit, as illustrated and hereinafter to be described in connection with Figs. 9 to 18 inclusive.

With the apparatus positioned as indicated in Fig. 2, the current will be fed to the consumer through the service switch and the meter over a circuit which may be traced as follows: from service lead 27 to terminal 25, through the combined fuse and switch blade 33' to switch contact 30', and then by way of the conductor strip 37 to the terminal 35, thence by way of conductor 45 to the series coil 52 of the service meter and conductor 46 to terminal 39, through the meter load disconnecting switch to terminal 40 and to conductor 49 of the load circuit, through the load circuit, and back by way of load conductor 48 to terminal 36, conductor strip 38, terminal 31, combined fuse and switch blade 34', and terminal 26 to the other service line conductor 28.

In order to make connection with the test contact clips 35, 36, 39 and 40 of the meter test apparatus, a test plug illustrated in Figs. 5, 6, 7 and 8, equipped with two depending angular-faced keys, or centering portions, 53 and 54, is provided. These are attached to the base of the plug 55 and are positioned slightly off center as shown in Figs. 5 and 7. Coöperating with these positioning members or keys is a suitable barrier 56, rigidly secured to the insulating base 34 of the test switch, said barrier being fitted with laterally extending wings whereby angular grooves or key-ways 57' for the reception of the positioning members 53 and 54 are provided.

Due to the off-centering of the keys or projecting members 54 and 53, and the necessity of alining the test switch contact clips 57, 58, 59 and 60, with the clip contacts 39, 40, 35 and 36 respectively, on the insulating base, it is impossible to insert the test plug knife blade contacts 57 to 60 inclusive into the test switch contact clips in a wrong position.

In the normal operative condition of the units illustrated in Figs. 1, 2 and 3, the cover of the service switch is retained closed by means of a lug and thumb nut connection, which consists of the lug 61, integrally with the cover 23, a screw 62 carried by the body of the inclosure, and a nut 63 having a collar 64 coöperating with the screw 62 and the lug 61 to hold the cover in its closed position. The thumb nut 62 is provided with an eye or perforation, and a like perforation is provided for the lug 61 through which is threaded a sealing wire 65, the ends of which are joined by any suitable seal such as 66.

A similar construction 67 is provided for holding the cover 51 of the test inclosure 33 in closed position, and a similar sealing means 68 is employed for sealing both the meter cover and the test switch cover 51 in closed position for the purpose of preventing tampering with the connection without detection.

When it is desired to test the service meter 44 the cover 51 of the test inclosure 33 is removed and the test plug illustrated in Figs. 5, 6, 7 and 8 is connected in position with its coöperating test contact clips. The test clips 57 to 60 inclusive of the test plug are mounted on the insulating base 55, the base 55 being equipped with a suitable operating handle 67'. The switch contacts 57 to 60 are preferably made L-shaped, each having an in-turned end 68, 69, 70 and 71. Ends 68, 70 and 71 are provided with binding posts such as 72, fitted with coöperating binding nuts 73. Connected to the clips 57, 59 and 60 by means of the binding nuts such as 73, are the test conductors 74, 75 and 76 respectively.

With the cover 51 of the test inclosure removed, the first operation in making the test is to insert the test plug with its associated test clips 57, 58, 59 and 60, in position in the coöperating test contact clips 39, 40, 35 and 36 respectively. When the test plug is thus placed in position the meter is bypassed by means of the conductor 77 interconnecting the terminals 58 and 59 of the test plug.

The next operation in making the test is to open the meter load disconnecting switch 41 which disconnects the service meter from the load circuit. When these operations have been performed the current or power from the service circuit is fed directly to the load circuit without passing through the service meter, said meter being disconnected from the load circuit, and the test circuit for calibrating the service meter is established and comprises a suitable test meter 78, and an artificial load 79, with the proper interconnections therebetween connected to the test plug.

This conversion of the circuit to the test condition in which the current to the customer is bypassed and the meter disconnected from the load circuit is performed without in any way operating the service switch and its appurtenant apparatus, and consequently the test plug and its associated connections, as well as the load circuit, are protected by the main service switch and fuses 33' and 34'.

With the apparatus in this condition, the flow of current to the load circuit may now be traced on the wiring illustrated in Fig. 3. From the service conductor 27 through the service switch to the interconnecting conductor 37, to the contact terminal 35, thence through the bypass conductor 77 to conductor 49 of the load circuit, through the load, back over conductor 48 of the load circuit to terminal 36, and thence through the interconnecting conductor 38 and the other side of the service switch to the other service lead 28.

In this circuit it will be noted that the meter load circuit which was connected from one side of the service circuit 27 through the service switch, the conductor 37 and contact 35, through the coil 52 of the meter to contact 39 of the load switch and thence through the blade of the load switch 41 and the terminal 40 of the load switch to the load conductor 49, having been bypassed, may be opened by the meter load disconnecting switch 41 at the contact clip 40, thereby disconnecting the meter at this point from the load circuit.

The service meter 44 can now be readily tested without interfering with the supply of current to the consumer and this test circuit may be traced as follows: from the service conductor 27, through one side of the service switch, the conductor 37, and thence over wire 45 through the series coil 52 of the service meter to terminal 39, thence over wire 74 to the series coil 80 of the calibrating meter, wire 81 to the test load 79, through the test load and thence by means of wire 76 to the contact 60 of the test plug, the terminal 36 and conductor 38, to the other side of the service switch and service wire 28.

In this meter test or calibrating circuit just outlined, the series coil of the service meter is connected in series with the series coil of the calibrating meter, and in series with an artificial load across the potential of the service circuit. The shunt coil of the service meter is connected across the line from the contact 35 to the contact 36. The shunt coil of the calibrating meter is connected across the same contacts, the current flowing from contact 35 through lead 75, the coil, leads 82 and 76 to the clip 36.

With these conditions established the meter can be properly calibrated without interference of any kind with the supply of power to the consumer. The load controlling switch or meter load disconnecting switch 41 is arranged to prevent the closing of the housing or inclosure 38 for the meter test switching apparatus, unless the said meter load disconnecting switch is in its normal position, in which condition the power supplied to the consumer passes through the series coil of the service meter. This requirement is desirable so as to necessitate the switching of the connections to such condition, after testing the meter, that the meter will be included in the service circuit.

To accomplish this purpose the blade 41 of the meter load disconnecting switch is fitted with a handle 83 of insulating material, as clearly indicated in Fig. 4, the said handle being so positioned that when the meter load disconnecting switch is operated to its extreme open position the curved forward apertured portion of said insulating handle will rest on the top edge of the inclosing wall of the housing 33. With the switch handle in this position it will be evident that the cover 51 cannot be placed upon said inclosure. In order to place said cover on the inclosure the blade of the meter load disconnecting switch must be switched to its closed position, and in order to insure that the blade will be moved to its extreme closed position the upwardly extending portion of the handle 83 is of such a size and is so designed that said upper portion of the handle will just clear the cover 51, when the said cover is locked in place. Consequently if at any time the switch blade 41 is operated so that the blade does not properly contact with its coöperating switch contacts, due to an incomplete operation of the switch blade, the said blade will be driven home to its closed position by the cover 51 when it is placed in position because of the intercontacting surfaces of the top of the handle 83 and the inside surface of the cover 51. Consequently when the tests are completed and the switch plug is removed the housing or inclosure cannot be put in its normal closed condition without switching the service meter into its proper position in the load circuit.

In this connection it should be noted that the meter load disconnecting switch, with its blade 41 and coöperating contacts 39 and 40, is connected in the load circuit so that the circuit to the consumer may be interrupted by this switch. The construction of this switch is such that it will properly carry all the current flowing in the load circuit and will likewise properly function to interrupt the current flowing in said circuit. The meter load disconnecting switch may consequently be used if desired in place of the service switch in the circuit here shown for interrupting the flow of current from the service circuit to the load circuit.

Referring now to Figs. 9, 10, 11, 12, and 13, which show the preferred embodiment of a two-wire service circuit fitted with a protective inclosure, carrying the service switch and the necessary testing apparatus, it will be noted that in this preferred embodiment all the apparatus utilized in controlling the service circuit as well as the apparatus which is used for test purposes, are inclosed in a single protective housing 84. The housing, as clearly illustrated in perspective in Figs. 9 and 10, is fitted with an opening, through which projects an operating handle 85 by means of which the actuator member 86 of the service switch 87 can be operated from the exterior of the housing. The housing 84 consequently serves to completely inclose and protect against tampering or unwarranted molestation the apparatus and circuits inclosed within the housing, and at the same time control of power from the load circuit to the service circuit is readily obtained by the exterior handle 85 which controls the operation of the service switch. The housing 84 is fitted on one end with a slidable end-plate 88, fitted with suitable wiring or conductor admitting means, in the particular instance conduit knock-outs 89, and at the other end with a slidable, removable meter hood 90, adapted to receive a meter in protective union with the switch inclosure 84. When the meter is fitted into the meter adapter 90, and the cover 91 of the inclosure locked in place, the apparatus and wiring within the housing which interconnects the meters, the test switching apparatus and the service switch, will be inclosed in a protective housing which cannot be entered into except by authorized individuals.

Obviously any type of end-plate 88 or meter hood 90 can be used in connection with the switch inclosure 84.

The perspective shown in Fig. 9 is taken with the box turned through 180 degrees from that shown in Fig. 10, in order to clearly show the apparatus used for switching and testing mounted within the inclosure.

Fig. 9 illustrates the condition of the apparatus in the switch inclosure when in service condition. Under these conditions the service wires enter through a suitable conduit, and are connected to the service switch, from which point they are wired through the fuses and by way of the meter load disconnecting switch 92 and the meter, not shown in the structure, to the load circuit.

The meter load disconnecting switch in this instance, as illustrated in Figs. 9 and 10, consists of the switch clip contacts 93 and 94, with which coöperates the switch blade 95. The switch blade 95 is pivotally mounted at 96 on the contact terminal 97. The switch clip contact 94 carries the terminal 98 and the test terminal 99. In a like manner the switch clip contact 93 carries the contact terminal 100. The switch clip terminal 93 is connected to the fuse socket 101 and the fuse socket 101 in turn is connected to the side 102 of the service switch 87. The switch blade 95 of the meter load disconnecting switch consists of a sector shaped or quadrantal plate 103 which carries at its upper periphery a normal flange 104. The blade 95 is also fitted with an operating handle 105 and with a perforation 106 and a like perforation similarly disposed at the other side of the blade. The contact clips 94 and 93 are also perforated as illustrated at 107 and 108. The perforations in the blade 95 coöperate with the perforations 107 and 108 in the contact clips 93 and 94 respectively; one of the perforations in the blade being in alinement with the perforations in the contact clips 93 and 94 respectively when the said blade is actuated to either its extreme upper or its extreme lower operating position. The alined perforations serve as a means for sealing or locking the meter load disconnecting switch in either of its operating positions, the sealing being accomplished in any of the usual methods employed, as, for example, by passing a wire through the alined perforations and sealing the ends thereof. Connected to the fuse sockets 101 and 109 are the conducting strips 110 and 111. Each of these strips is fitted with test pins or terminals 112 and 113. The meter load disconnecting switch, the service switch and the associated switches and bars are all mounted upon an insulating base 114, secured to the base 115 of the housing by means of screws such as 116.

The circuit connections of the apparatus in normal service condition, when the apparatus is positioned as indicated in Fig. 9, can now be traced on Fig. 12 as follows: from service lead 117 through one side of the service switch to fuse 101, through conductor 110 to the contact 100, thence by way of wire 118 through the series coil 119 of the service meter, conductor 120, to terminal 98 of the meter load disconnecting switch, through the blade 95 of said switch, terminal 97, and out through the load circuit, thence back through conductor 121 to the link 122 of the meter, over conductor 123 to the contacting bar 111, and finally by way of fuse 109 and the other blade of the service switch to the other service lead 124.

In the circuit just traced the meter load circuit which extends from one side of the load to one side of the service circuit may be traced from the service wire 117 through one blade of the service switch, fuse 101, conductor 110, terminal 100, conductor 118, series coil 119 of the service meter, to terminal 98 of the meter load disconnecting switch, through the operating blade 95 of the switch and contact 97 thereof to one side of the load circuit.

It will be observed, therefore, that the series coil of the service meter is connected from one side of the service circuit to the load circuit through the movable blade of the meter load disconnecting switch, and consequently that if said movable blade 95 is shifted to its alternate position, breaking the contact between the blade and the spring contact clip 94, the meter will be disconnected from the load circuit.

The operating blade 95 of meter load disconnecting switch, is so positioned and so designed with respect to its coöperating switch contact clips 93 and 94 that said blade will make contact with the contact clips toward which it is moving before it will break contact with the contact clips from which it is moving. In other words, this switch is a make-before-break switch.

When the blade 95 of this meter load disconnecting switch is shifted from the switch contacts 94 to the switch contacts 93, it will, as hereinbefore stated, disconnect the meter from the load circuit when the contact between the blade 95 and the contact 94 is broken, but before this connection is broken contact between the blade 95 and the spring contact clips 93 is made, thereby bypassing the meter and supplying power to the customer from the service leads, direct through the service switch and fuses to the load circuit. Due to this make-before-break connection of the meter load disconnecting switch, the customer's service circuit is not interrupted when the switch from service condition to the test condition is made, the sequence of this operation being controlled by the switch whereby the meter will be bypassed before it is disconnected from the load circuit.

The circuit conditions when the meter is to be tested are illustrated in Fig. 10, which shows the apparatus condition, and Fig. 13 which shows a wiring diagram of the circuit conditions. When a test is to be conducted, the test plugs 124, 125 and 126 are placed in position on the test terminals 99, 112 and 113 respectively. These test plugs are interconnected with the desired calibrating meter and artificial load circuit as indicated in the circuit diagram in Fig. 13. The test plugs are constructed with an insulating sleeve 127 within which is positioned the conductor 128, arranged for coöperation with the test pins 99, 112 and 113. The conductor 128 is connected to suitable wires connected with the testing apparatus. When the test plugs 124, 125 and 126 have been placed in position, the meter load disconnecting switch is operated to its testing position as indicated in Figs. 10 and 13.

It will be observed that the test plug 124, which is fitted on the test terminal 99, is equipped with a projecting annular collar 129 at its lower end. This collar prevents insertion of this test plug on its coöperating test pin 99 when the meter load disconnecting switch has been operated to the testing position, and likewise prevents removal of this testing plug from its coöperating testing pin unless the meter load disconnecting switch is operated to the service position because of the interpositioning of the flange 104 in the path of the collar 129 as clearly illustrated in Figs. 9, 10 and 11.

By means of this interaction between the annular projecting collar 129 of the test plug and the flange 104 of the meter load disconnecting switch it is impossible after a test has been made, to remove the test plug until the service meter has been shifted from the testing circuit into the load circuit. This therefore constitutes a foolproof feature whereby it is impossible for a careless operator to remove his testing apparatus, close up the switch inclosure and leave the circuits in condition whereby power will be supplied to the customer with the meter out of the service circuit. Likewise, due to the length of the plugs 124, 125 and 126, it is impossible to close the switch housing or inclosure until the said plugs have been removed from their coöperating testing pins, and inasmuch as the plug 124 cannot be removed until the meter load disconnecting switch has been moved to the service condition, it is impossible for an operator to close the protective housing for the service switch and test switching apparatus until the service meter is connected in proper circuit relationship with the load and service circuits.

The connections for the service and testing conditions as indicated in the circuit diagram on Fig. 13, for the condition of the apparatus as shown in Fig. 10, may now be traced as follows: The power is supplied to the consumer from service lead 117, through one side of the service switch, the fuse 101, the conductor 110, the blade 95 of the meter load disconnecting switch, terminal 97, to one side of the load circuit, and thence through the load, back over conductor 121, meter link 122, conductor 123, conductor 111, fuse 109, and through the other blade of the service switch to the other side of the service circuit 124.

The flow of current through the circuit just traced is through the movable blade of the meter load disconnecting switch which bypassed the meter when it was shifted from its service to its test condition, and then disconnected the meter from the load circuit as hereinbefore described.

The testing circuit may be traced as follows: from the service lead 117 through one blade of the switch, to the fuse 101, conductor 110, contact terminal 100, wire 118, series coil 119 of the service meter, conductor 120, terminal 98, test plug 124, conductor 130, artificial load 131, series coil 132 of the calibrating meter, conductor 133, to the test plug 126, test pin 113, conductor 111, fuse 109, the other blade of the service switch and thence to the other service conductor 124. This calibrating or meter test circuit just traced contains the service and calibrating meters in series together with an artificial load, whereby the service meter can be checked against the calibrating meter. The potential coil of the test meter is connected directly across the line from conductor 110 by means of test plug 125, conductor 134, through the potential coil of the meter 135, conductor 136, and test plug 126, to conductor 111 and the other side of the service lead.

For a three-wire circuit the apparatus is arranged in an inclosed housing 137 as indicated in Fig. 14. As there illustrated the service switch 138 is externally operated by means of the external operating handle 139 when the cover 140 is locked in position to completely inclose all the apparatus and the wiring contained within the housing in a protective inclosure to prevent tampering therewith. In the case of a three wire circuit the meter load disconnecting switch shown at 92 in Fig. 9 is duplicated on both the positive and negative sides of the service circuit, and the movable blade 95 of the switch is interconnected by an insulating handle 141 by means of which the blades 95 of the two switches are operated in unison.

With the apparatus shown in this figure, when a test is to be made, a plug with a collar similar to 124 is inserted on the fixed test contacts or terminals 142 and 143. Likewise a plug of the type illustrated at 126 is placed on the fixed test contact terminal 144 and a plug of the type shown at 125 is inserted on the fixed test contact terminal 145. Plugs 125 and 126 are similar in construction, the only difference being that plug 126 is made somewhat heavier inasmuch as it carries the test current, whereas plug 125 is merely a potential plug.

The arrangement of apparatus in the three-wire circuit is very similar to that used in connection with the two-wire circuit and consequently it is deemed necessary, in connection with this apparatus, to merely trace the circuit for the service condition as indicated by the superimposed wiring in the box inclosure in Fig. 14, and for the test condition as indicated in the wire diagram in Fig. 15.

The service circuit as illustrated in the wiring superimposed upon the apparatus in the plan view of Fig. 14 may be traced from the positive service lead 146 to the service switch contact 147, through the blade 148 of the service switch, the fuse 149, the conductor 150, connector 151, conductor 152, service meter coil 153, conductor 154, connector 155, blade 95 of the load switch and connector 156 to one side of the load circuit, and thence through the load to the neutral wire 157, connector 158, fuse 159, switch blade 160, connector 161, and back to the neutral lead 162 of the service circuit. The connections from the other side of the service circuit through the meter and load to the neutral are identical to those just traced, using the apparatus on the opposite side of insulating base 162'.

When it is desired to make a test with a three-wire circuit of the type here shown, in which test the two series coils of the meter are connected across the positive and negative of the service wires, test plugs like plug 124 are inserted on the test terminals or pins 142 and 143, and test plugs like plug 125 are inserted on the test terminals 144 and 145. When the test terminals are thus inserted the operating arm 141 of the meter load disconnecting switch is moved to its top position whereby the meter is first bypassed and then disconnected from the load circuit on either side of the line as hereinbefore described in connection with a two-wire circuit.

Likewise when the meter load disconnecting switch is thus operated the plugs inserted on the test pins 142 and 143 cannot be removed from the said test pins until the meter test disconnecting switch is returned to the lower position, in which the meter coils are connected in series with the load circuit. The purposes and functions of this coöperation between the plugs and the meter load disconnecting switch have all been described heretofore in connection with the two wire circuit.

The circuit in testing condition may now be traced on the diagram Fig. 15 as follows: from the positive service wire 146 to the connector 147, through the service switch blade 148, the fuse 149, the conductor 150, the terminal contact 151, conductor 152, series coil 153 of meter, conductor 154, terminal 155, fixed test terminal or pin 143, test plug 124, artificial load 163, conductor 167, series coil 168 of calibrating meter, conductor 169, test plug 128 and test terminal 142, conductor 170, meter coil 171, conductor 172, conducting bar 173, fuse 174, switch blade 175 and thence back to the negative lead of the service circuit 176.

In this circuit it will be observed that the two service meter coils are connected in series with the coil of the calibrating meter, together with an artificial load and across the outside wires or full potential of the service circuit. The test plug connected to the fixed test contact terminal 144 is connected by means of wire 177 to one side of the potential coil of the calibrating meter, the other side of this coil of the calibrating meter being connected by means of the conductor 178 and the test plug to the fixed test contact pin 145, to the other or negative side of the service potential.

As the service meter is bypassed during the test, the service circuit may be traced as follows: from the positive side of the service circuit 146 to terminal 147, service switch blade 148, fuse 149, conductor 150, by means of movable switch blade 95 of the meter load disconnecting switch and terminal 156 to one side of the load circuit, through the load circuit and by means of the neutral wire to the terminal 158, the fuse 179 and the switch blade 160 to the neutral wire of the service circuit 179. The other side of the service circuit during test condition is identical to that just traced, using the apparatus and wiring on the opposite side of the insulating base 162'.

When it is desired in a three wire circuit to test the two coils of the service meter across from one side of the line to the neutral, the apparatus and circuit for testing must be somewhat modified, this modification consisting essentially in disconnecting one of the meter coils from the service circuit as well as the load circuit, the modification being illustrated in Figs. 16 and 18. In this case the meter load disconnecting switch operating handle 180 is connected to three switching elements 95, whereby all of these elements will be operated simultaneously when the meter load disconnecting switch is operated. For testing purposes in this case five plugs are used which are connected to the fixed test contact terminals 181, 182 and 183, 184, and terminal 185 hidden under the operating handle 180. The general arrangement of parts within the protective inclosure is the same in this case as in the disclosure shown in Fig. 14, the service switch being operable from the exterior of the housing.

However, when it is desired to make this character of test it is necessary to guard against circuit complications in the nature of short circuits when the testing apparatus is connected in circuit. For this reason the apparatus shown in Fig. 16 is fitted with fool proof guards to prevent these circuit complications, in addition to the guard provided in all the circuits whereby it is necessary to return the meter load disconnecting switch to the position in which the service meter is connected in the load circuit before all the portable testing apparatus can be removed. The circuit complications referred to and the sequence of operation of the apparatus shown in Fig. 16 will be readily apparent from the following detailed tracing and description of the circuits.

The circuit in the service condition is indicated by the wiring superimposed upon the apparatus shown in Fig. 16. This circuit may be traced as follows: from the positive service wire 186 to the contact 187, the switch blade 188, fuse 189, the conductor bar 190, conductor blade 95, connector terminal 191, conductor 192, meter coil 193, conductor 194, through the switch blade 95' to terminal 195, to the load conductor 196 and thence back through the load to the neutral load wire 197 and through the fuse and service switch to the neutral service wire 198. The circuit for the other leg of the service lead to neutral is traceable from the negative service lead 214, the terminal 200, service switch blade 201, fuse 202 and conductor 203 to terminal 203', thence by way of conductor 204 through coil 205 of the service meter and conductor 206 to terminal 207, and then by way of switch blade 95 and terminal 218 to the load wire 219, through the load circuit and back by way of neutral load wire 197, fuse 213, the service switch blade 213' and the terminal 180' to the neutral service lead 198.

When it is desired to test, a plug with a collar is inserted on fixed test contact terminal 184, which test plug cannot be inserted on said test pin after the meter load disconnecting switch has been operated because of the interposition of the flange 104 of the blade 95 as hereinbefore described. A potential plug like plug 125 can also be inserted on the test pin 183 and a plug with a collar on the test pin 182 before the meter load disconnecting switch is operated, but preferably the last two plugs are connected in place after the switch has been operated when the plugs connected to test pins 181 and 185 are connected in circuit The plug that is connected to pin 181 is fitted with a collar like plug 124 and due to this collar the plug cannot be connected to pin 181 because of the interposition of the flange 104 of the blade 95 in the path of the collar of the plug, as clearly shown in Fig. 16. When the switch is operated, however, the flange 104 is moved out of the path of the collar and the test plug can be placed in position. Likewise when the switch is in its lower or normal service position the actuating insulating arm 180 thereof, rests directly over the test pin 185 (see Figs. 16 and 17) and thereby prevents the connection to this pin of a test plug like 126 until the switch is operated to its upper position. Therefore in view of the inherent design of the apparatus it is impossible to connect the test plug to pin 184 after the meter load disconnecting switch has been operated to its upper position, and it is impossible to remove the plug from this test pin until after said switch is operated to its lower position. This plug therefore acts as the fool proof guard whereby all of the portable testing apparatus cannot be removed from circuit nor the apparatus housing closed until the service meter is switched from the test circuit into the load circuit. Also it is impossible to connect the test plugs to pins 181 and 185 until after the meter load disconnecting switch has been operated and it is impossible to return the said switch to its lower or normal service position until the plugs connected to pins 181 and 185 are removed, the return of the switch being prevented by the interpositioning of the flange 104 of the switch 95, the said flange having a square end like that shown at 181' in Fig. 9, whereby the end of the flange will strike on the collar of the plug, and the operating arm or handle 180 of the switch will strike against the body of the plug connected to pin 185 which will prevent the return of the switch until this plug has been removed. The precautions provided for preventing the insertion of the test plugs on the test pins 181 and 185 and the necessity for removing both of these plugs before the switch can be returned to its lower position are essential to prevent the circuit complications hereinbefore referred to and described hereinafter in the detailed tracing of the testing circuit.

If it be assumed now that the meter load disconnecting switch illustrated in the normal service condition in Fig. 16 has been operated to its upper or test position, and the testing plugs placed in the respective positions in the order or sequence hereinbefore described, then the testing circuit illustrated diagrammatically in Fig. 18 will have been established, which circuit may now be traced as follows: from the neutral side of the service circuit through the service switch to the fuse 213, thence by way of the test terminal 182, a test plug, conductor 212, and another test plug to test terminal 181, and then by way of terminal 191, conductor 192, service meter coil 193 and conductor 194 to test terminal 185, from where the circuit can be followed through a test plug conductor 211, the artificial load 210, the series coil 209 of the test meter, the conductor 208, a test plug, test terminal 184, contact terminal 207, and conductor 206, through the other coil 205 of the service meter and thence by way of conductor 204, terminal 203', conductor 203, the fuse 202, the service switch blade 201 and terminal 200 to the negative side 214 of the service circuit.

The circuit of the potential coil of the meter for the test circuit may be traced from the fixed test contact terminal 182, test plug and conductor 215, through the potential coil to conductor 216, the test plug and contact terminal 183 to the negative side of the line.

It will be observed from the circuit just traced that the service meter coil 193 is connected in test circuit by means of test plugs connected to test pins 181 and 185, both ends of the coil 193 of the service meter being entirely disconnected by the operation of the meter load disconnecting switch, one end from the load circuit and the other end from the service circuit. This complete disconnection of this coil of the meter from the load and service circuit makes it possible, by means of the test plugs and test pins provided, to connect the meter in any type of test circuit. Consequently whenever it is necessary for the purpose of making tests with other circuits to completely disconnect the meter coil from the load and service circuits, a meter load disconnecting switch having two blades for each coil of the meter similar to that shown in Fig. 16 must be used.

In the test circuit just traced it will also be noted that the calibrating coil as well as the two coils of the service meter are all connected in series with an artificial load between one side of the circuit and neutral.

The circuit complications which are avoided because the test plug which takes the fixed test contact terminal 185, cannot be placed upon the said contact until the load meter disconnecting switch is thrown to the testing position and vice versa, will now be described. This precaution serves to prevent the inclusion of the test circuit across the negative and positive side of the line, or full potential, which would occur if the test plug were connectible to test pin 185 before the load disconnecting switch were operated. Inasmuch as the calibrating circuit is adapted for calibrating on one-half the voltage maintained across the line between negative and positive, the calibrating apparatus would be injured by this higher voltage and consequently it is essential that a guard be provided to prevent the placing of the plugs on test pin 185 and connecting up the testing apparatus until the meter load disconnecting switch is operated. The positioning of test terminal 185 under the operating handle 180 of the meter load disconnecting switch consequently serves as a fool proof feature whereby the testing apparatus cannot be damaged by an excessive current or potential.

Likewise as hereinbefore stated the collared test plug cannot be placed on test pin 181 until the meter load disconnecting switch has been operated to bypass the meter, and vice versa. This precaution is necessary to prevent the connection of the test conductor 212 and its associated plugs to their respective test pins 181 and 182, which connection would short circuit the neutral and positive leads over a circuit traceable from the positive service conductor through the fuse 189, the conductor strip 190, blade 95 of the meter load disconnecting switch and thence by way of the test pin 181, its associated test plug, conductor 212, the other test plug, and fuse 213 to the neutral side of the service circuit. Obviously when the meter load disconnecting switch is first operated before test pin 181 and its coöperating test plug are connected this short circuit just traced is interrupted by the switch blade 95 at terminal 181. Also since the coöperation of the projecting collar on the plug associated with test pin 181 and the flange 104 of the blade 95 prevents the return of the meter load disconnecting switch to service condition until the said test plug has been removed, and the operating arm 180 of the meter load disconnecting switch cannot be returned to normal service condition until the test plug connected to test terminal 185 has been removed, the aforesaid circuit complications cannot be established by a premature operation of the switch. Also since the test plug connected to test terminal 184 cannot be removed until the switch has been returned to normal service condition, all the portable test apparatus cannot be removed and hence the apparatus housing cannot be closed until the meter load disconnecting switch has been operated to connect the meter coils in the load circuit. It will be noted that the test lead 212 has a plug with a collar attached to either end. This precaution is taken so that no matter what end of the test lead 212 is connected to test terminal 182, the plug attached to the other end will be equipped with the necessary guard to prevent the completion of the short circuit between the positive and neutral service wires. Obviously the collar on the plug when used with the test pin 182 serves no useful function.

It therefore follows that the meter load disconnecting switch serves to insure the proper sequence of operation in setting up the test circuit and in disconnecting the test apparatus, whereby no circuit difficulties will be encountered and whereby the service circuit will be left properly connected.

During the testing condition the meter coils are bypassed by means of the meter load disconnecting switch and the power is supplied to the consumer over a circuit that may be traced from the one side of the service circuit 186 through the terminal 187 to switch blade 188, fuse 189, conductor strip 190, movable blade 95 of the meter load disconnecting switch, the terminal 195, and thence to the load circuit, through the load and back to the neutral side of the service circuit 198. The connections for the other side of the circuit may be traced from the negative service lead 214 through terminal 200 to switch blade 201, fuse 202, conductor strip 203, movable blade 95 of the meter load disconnecting switch and terminal 218 to the load conductor 219, through the load and thence back to the neutral side of the service circuit 198.

It will be evident that in all the circuits hereinbefore described, whether testing or service circuits, the load, as well as the testing apparatus, is always protected by the service switch and the fuses, the fuses and service switch always being included in series in these circuits.

Likewise, the service controlling apparatus, as well as the meter testing apparatus and the meter, with their interconnections between the service circuit and the load circuit, are all inclosed in a protective housing, casing or inclosure, which prevents unauthorized tampering with any of this apparatus or any of the wiring, while at the same time the service switch is so arranged that it can be readily operated from the exterior of said casing or housing, thereby giving control of the service circuit from the exterior of the housing. Inasmuch as all of the apparatus is inclosed within the housing, testing of the apparatus can be accomplished only when the housing or casing is opened, and in that manner access to the testing switches, terminals and apparatus as well as wiring becomes impossible to those not entitled or authorized to have access thereto.

The coöperation of the parts, apparatus and circuits as described in the foregoing consequently results in a device in which the service switch can be controlled by any and all individuals, and the control of the apparatus and wiring for meter testing and any other complicated electrical functions, which require experts, can be accomplished only upon opening the cover, and they are therefore inaccessible to anyone except experts authorized to make the meter tests or any other changes desirable in the circuit connections. Further, the test appliances are all provided with proper guards and fool proof features, whereby it is impossible to make the wrong connections and also impossible to remove all the portable testing apparatus or close the apparatus housing without first returning the service meter into the load circuit.

In the descriptions hereinbefore outlined, the tests have all been made in connection with an artificial load. It will be obvious to anyone skilled in the art, however, that with the apparatus described any of the authorized standard meter testing circuits can be established and the standard meter tests made. Thus, for example, there are four regular standardized methods of testing meters:

First, test with an artificial or a resistance load using central station power, which is used for either alternating or direct current. This is the type of test which has been illustrated in the foregoing descriptions.

Second, there is what is known as the phantom load test, which is adaptable for alternating current only.

Third, the customer's load test, in which the customer's load is used in place of the artificial load, and Fourth, test with separate sources, wherein the service potential is supplied to the shunt coils of the service and test meters and in which the series coils are energized from a low voltage storage battery through a variable resistance.

It will be evident, in view of the fact that the meter is disconnected by the load disconnecting switch from the load circuit in several embodiments of the apparatus hereinbefore described, and disconnected from both the load and service circuits in one embodiment, that any of these circuits can be readily set up by anyone skilled in the art.

Obviously this invention is not limited to the specific embodiment thereof herein illustrated and described but is capable of many variations and other applications within its spirit and scope, as pointed out in the following claims.

What is claimed is:

1. In a device of the character described, in combination, a service switch, a protective inclosure therefor having a cover, means located exterior of said inclosure for operating said switch, a load circuit in electrical connection with said switch, a meter adapted to measure the power delivered to said load circuit, and meter testing means independent of said service switch for calibrating said meter and accessible only upon the opening of said cover.

2. In a device of the character described, in combination, a service switch, a protective inclosure therefor, means located exterior of said inclosure for operating said switch, a load circuit in electrical connection with said switch, a meter adapted to measure the power delivered to said load circuit, a calibrating circuit and meter testing means independent of said service switch for coöperation therewith located within said inclosure and accessible only when said cover is opened.

3. In a device of the character described, in combination, a service switch, a protective inclosure therefor, means located exterior of said inclosure for operating said switch, a load circuit in electrical connection with said switch, a meter adapted to measure the power delivered to said load circuit, and meter testing means independent of said service switch for calibrating said meter, accessible only upon the opening of said cover, and comprising means for bypassing the load current around the meter and then disconnecting the meter from the load circuit.

4. In combination, a service circuit, including a service switch, a protective housing for said switch, a load, a meter load circuit, a load current by-pass, a meter calibrating circuit, means operable from the exterior of the inclosure to open and close said service switch, means operable only when the said housing is open to interrupt the meter load circuit and close the meter calibrating circuit, said by-pass insuring an uninterrupted flow of current when the meter load circuit is opened.

5. In combination, a service circuit including a service switch, a protective housing for said switch, a load, a meter load circuit, a load current by-pass, a meter calibrating circuit, means operable from the outside of said housing to open and close said service switch, a meter included in said meter load circuit, conductors interconnecting said meter and service switch, a meter adapter intermediate said meter and said housing completely inclosing said conductors, and means operable only when said housing is opened to interrupt the meter load circuit and close the meter calibrating circuit, the flow of current to the load circuit being uninterrupted when the meter load circuit is opened.

6. In a system of the character described, a service switch, a protective inclosure for said switch, means positioned outside of said inclosure for operating said switch, a load circuit in electrical connection with said switch, a calibrating circuit, a meter coil interposed between the said load circuit and said switch, and means independent of said service switch positioned in said inclosure and accessible only when the inclosure is opened for switching the meter coil from the load circuit into said calibrating circuit.

7. In a device of the character described, in combination, a service switch, a protective inclosure therefor, means located exterior of said inclosure for operating said switch, a load circuit in electrical connection with said switch, a meter adapted to measure the power delivered to said load circuit, means operable to switch said meter into a testing circuit, the said means being positioned in said inclosure and accessible only when the inclosure is opened, and means necessitating the switching of said meter into the load circuit before said inclosure can be closed.

8. In a device of the character described, a service switch, a protective inclosure for said switch, means positioned outside of said inclosure for operating said switch, a load circuit in electrical connection with said switch, a calibrating circuit, a meter interposed between the said circuit and said switch to measure the power delivered to said load circuit, means positioned in said inclosure and accessible only when the inclosure is opened for switching the meter from the load circuit into said calibrating circuit, and means whereby the flow of current from the service switch to said load circuit will be uninterrupted during said switching operation.

9. A device of the character described, comprising, in combination, a service switch, a protective inclosure for said switch, means positioned outside of said inclosure for operating said switch, a load circuit in electrical connection with said switch, a meter adapted to measure the power delivered to said load circuit, means for disconnecting said meter from said load circuit, the said means being operable only when the said inclosure is opened, and testing means adapted to calibrate said meter when thus disconnected.

10. A device of the character described, comprising, in combination, a service switch, a protective inclosure for said switch, means positioned outside of said inclosure for operating said switch, a load circuit in electrical connection with said switch, a meter adapted to measure the power delivered to said load circuit, means for disconnecting said meter from said load circuit, the said means being operable only when the said inclosure is opened, testing means adapted to calibrate said meter when thus disconnected, and means necessitating the inclusion of the meter in the load circuit before the said testing means can be removed.

11. In combination, a service circuit, including a service switch, a protective housing for said switch, a load, a meter load circuit, a meter calibrating circuit, means operable from the exterior of the inclosure to open and close said service switch, means operable only when the said inclosure is opened to interrupt the meter load circuit and close the meter calibrating circuit, and means requiring the re-closing of the meter load circuit to permit the closing of said housing.

12. A device of the character described, comprising, in combination, a service switch, a protective inclosure for said switch, means positioned outside of said inclosure for operating said switch, a load circuit in electrical connection with said switch, a meter adapted to measure the power delivered to said load circuit, means for disconnecting said meter from said load circuit, the said means being operable only when the said inclosure is opened, testing means adapted to calibrate said meter when thus disconnected, means necessitating the reëstablishment of normal circuit connections through the meter to the load circuit before the said testing means can be removed from the said testing circuit, and means associated with said testing means requiring the removal of said testing means before the protective inclosure can be closed.

13. In combination, a service circuit including a service switch, a protective inclosure for said switch, a load, a meter load circuit, a meter calibrating circuit, means operable from the exterior of the inclosure to open and close said service switch, and means operable only when the said inclosure is opened to interrupt the meter load circuit and establish the meter calibrating circuit.

14. In combination, a service circuit including a service switch, a protective inclosure for said switch, a load, a meter load circuit, a meter calibrating circuit, means operable from the exterior of the inclosure to open and close said service switch, a meter load controlling switch included in said meter load circuit, said controlling switch being operable only when said inclosure is opened.

15. In a system of the character described, in combination, a service circuit including a service switch, a protective inclosure for said switch, a load, a meter load circuit, a meter calibrating circuit, means operable from the exterior of the inclosure to open and close said service switch, a meter load controlling switch included in said meter load circuit, a test terminal and cord coöperating with said switch, said terminal and cord being included in said meter calibrating circuit, and means whereby said terminal and cord can be disconnected from said calibrating circuit only after the said switch has been operated to establish the meter load circuit.

16. In combination, a service circuit including a service switch, a protective inclosure for said switch, means operable from the exterior of the inclosure to open and close said service switch, a load, a meter load circuit, including a meter load controlling switch, a meter calibrating circuit, including a test terminal coöperative with said controlling switch, and means whereby said terminal can be connected or disconnected only when said meter load controlling switch is in a pre-determined position.

17. In a device of the character described, in combination, an ironclad inclosure including a cover, a service switch mounted therein, means for operating said service switch located exterior of said inclosure, a load circuit, a meter adapted to measure the power delivered to said load circuit, and a meter load disconnecting switch operable only when the cover of said inclosure is raised to permit access to the interior thereof, the said disconnecting switch controlling the connection between the meter and the load circuit.

18. In a device of the character described, in combination, a service switch, a protective inclosure therefor, means located exterior of said inclosure for operating said switch, a load circuit in electrical connection with said switch, a meter adapted to measure the power delivered to said load circuit, and coöperating switch and testing means whereby said meter can be switched from the load circuit and tested only when said inclosure is opened and the said inclosure can thereafter be closed only after the meter is re-connected to the load circuit.

19. In a device of the character described, in combination, a service switch, a protective inclosure therefor, means located exterior of said inclosure for operating said switch, a load circuit in electrical connection with said switch, a meter adapted to measure the power delivered to said load circuit, a meter load disconnecting switch, testing means coöperative with said disconnecting switch to provide a testing circuit for the calibration of said meter, means associated with said disconnecting switch whereby said testing means can only be connected before the disconnecting switch is operated to disconnect the meter from the load circuit, and means associated with said testing means whereby said disconnecting switch must be operated to reconnect the meter to the load circuit before the said testing means can be disconnected.

20. A device of the character described, comprising, in combination, a service switch, a protective inclosure therefor, means located exterior of said inclosure for operating said switch, a load circuit in electrical connection with said switch, a meter adapted to measure the power delivered to said load circuit, a meter load disconnecting switch, testing means coöperating with said disconnecting switch to calibrate said meter, and means associated with said testing means whereby the said testing means can be connected into the testing circuit only before the disconnecting switch is operated and thereafter the said switch operated to connect the meter to the load circuit before the said testing means can be removed from said switch.

21. In a device of the character described, in combination, an ironclad inclosure including a cover, a service switch mounted therein, means for operating said service switch located exterior of said inclosure, a load circuit, a meter adapted to measure the power delivered to said load circuit, conductors interconnecting said meter and said service switch, a meter adapter intermediate said meter and said inclosure to inclose said conductors, and a meter load disconnecting switch operable only when the cover of said inclosure is raised to permit access to the interior thereof, the said disconnecting switch controlling the connection between the meter and the load circuit.

22. In combination, a service circuit including a service switch, a protective housing for said switch, a load, a meter load circuit, a meter calibrating circuit, means operable from the outside of said housing to open and close said service switch, a meter coil included in said meter load circuit, conductors interconnecting said meter coil and said service switch, a meter adapter intermediate said meter and said housing completely inclosing said conductors, and a meter load controlling switch operable only when said housing is opened to interrupt the meter load circuit.

23. In combination, a service circuit including a service switch, and a protective housing for said switch, a load, a meter load circuit, a load current by-pass, a meter calibrating circuit, means operable from the outside of said housing to open and close said service switch, a meter coil included in said meter load circuit, conductors interconnecting said meter coil and said service switch, a meter adapter intermediate said meter and said housing completely inclosing said conductors, a meter load controlling switch operable only when said housing is opened to interrupt the meter load circuit, a test terminal included in said calibrating circuit, which terminal can be connected in circuit only when the meter load controlling switch is positioned to connect the meter coil to the load circuit, the said switch being operated to disconnect the meter coil from the load circuit during calibration, and means whereby said switch must be operated to reëstablish the meter load circuit before the said test terminal can be removed from said calibrating circuit, the flow of current in the load circuit being uninterrupted during the said switching operations.

24. In combination, a service circuit including a service switch, a protective housing for said switch, a load, a meter load circuit, a load current by-pass, a meter calibrating circuit, means operable from the outside of said housing to open and close said service switch, a meter coil included in said meter load circuit, conductors interconnecting said meter coil and said service switch, a meter adapter intermediate said meter and said housing completely inclosing said conductors, a meter load controlling switch operable only when said housing is opened to interrupt the meter load circuit, a test terminal included in said calibrating circuit, which terminal can be connected in circuit only when the meter load controlling switch is positioned to connect the meter coil to the load circuit, the said switch being operated to disconnect the meter coil from the load circuit during calibration, means whereby said controlling switch must be operated to reëstablish the meter load circuit before the said test terminal can be removed from said calibrating circuit, said test terminals being so positioned that the said housing cannot be closed until said test terminal is removed from circuit thereby insuring the inclusion of the meter in the load circuit when the test terminal is removed for the purpose of closing the housing, the flow of current being uninterrupted in the load circuit during said switching operations.

25. The combination with a service switch, suitable protective inclosing means therefor, a meter and a protective adapter joining said meter and said switch inclosing means, means operable from the exterior of said inclosing means to operate said service switch, a by-pass adapted to shunt the load current around the meter without interrupting the load current, a meter load disconnecting switch adapted to disconnect the meter from the load, test circuit terminals for connecting meter test apparatus in circuit, conductors passing through said meter adapter and joining the meter with the switch, of suitable cover means for permitting access to said service switch and to said controlling switch whereby said service switch, controlling switch and the meter parts and all interconnecting conductors are inclosed and protected from unwarranted interference while said service switch and controlling switch are accessible for authorized manipulation.

26. In a device of the class described, the combination with a service switch associated with fuses, a meter, a load circuit and interconnecting means therebetween whereby the meter will normally measure the flow of power to the load circuit, and a test circuit including the meter, the meter being by-passed and disconnected from the load circuit, said test and load circuits being in parallel and both being protected by said fuses, of a protective inclosure about all of said parts and means operable from the exterior of said inclosure to operate said switch, said interconnecting means being accessible only when said inclosure is open.

27. In a device of the class described the combination with a service switch associated with fuses, a meter, a load circuit and interconnecting means therebetween whereby the meter will normally measure the flow of power to the load circuit, and a test circuit including the meter, the meter being by-passed and disconnected from the load circuit, said test and load circuits being in parallel and both being controlled by said switch and protected by said fuses, of a protective inclosure about all of said parts and means operable from the exterior of said inclosure to operate said switch, said interconnecting means being accessible only when said inclosure is open.

28. In a device of the class described, in combination, a protective housing, a service switch therein, a plurality of fixed contacts, some of which are connected to the service switch, others of which are connectible to a meter and others of which are connectible to a load, a plurality of test connection contacts associated with the fixed contacts whereby test leads associable with a test meter may be connected, means for interconnecting a bypass between a load connectible contact and a service switch connected contact, and means whereby the accessibility of the test connection contacts for connection or disconnection of the test leads and the manipulation of the bypass is controlled in a definite sequence.

29. Service and meter testing apparatus comprising in combination a service switch, a load circuit in electrical connection with said switch, a meter adapted to measure the power delivered to said load circuit, a meter testing circuit, means to switch said meter from said load circuit to said meter testing circuit, a meter testing appliance in said test circuit and means necessitating the switching of said meter into the said load circuit before said testing appliance can be removed.

30. Service and meter testing apparatus comprising in combination a service switch, a load circuit in electrical combination with said switch, a meter adapted to measure the power delivered to said load circuit, a meter testing circuit, means to switch said meter from said load circuit to said meter testing circuit and bypass said meter, whereby said load circuit is connected directly through said means to said service switch, a meter test appliance in said test circuit and means necessitating the switching of said meter into said load circuit before said meter test appliance can be removed.

31. Service and meter testing apparatus comprising in combination a service switch, a load circuit in electrical connection with said switch, a meter adapted to measure the power delivered to said load circuit, a meter testing circuit, means to switch said meter from said load circuit to said meter testing circuit, a meter test appliance in said test circuit, said switching means serving to switch the meter to said test circuit and necessitating the switching of said meter to the load circuit before said test appliance can be removed.

32. Service and meter testing apparatus comprising in combination a service switch, a load circuit in electrical connection with said switch, a meter adapted to measure the power delivered to said load circuit, a meter testing circuit, means to switch said meter from said load circuit to said meter testing circuit, a meter testing appliance in said test circuit, said switching means serving to simultaneously bypass the meter and switch the meter to said test circuit, and also necessitating the reswitching of said meter to the load circuit before the said testing appliance can be removed.

33. Service and meter testing apparatus comprising in combination a service switch, a load circuit in electrical connection with said switch, a meter adapted to measure the power delivered to said load circuit, a meter testing circuit, a meter load disconnecting switch, said switch comprising a movable switch blade of substantially quadrantal shape and coöperating fixed contacts, a meter test contact associated with one of said fixed contacts, a peripheral flange on said switch blade, substantially normal to the face thereof, said meter load disconnecting switch serving to switch said meter from said load circuit to said meter test circuit, a meter testing appliance coöperating with said meter testing contact, the said flange on said meter load disconnecting switch necessitating the interconnection of said test contact and test appliance when a meter test is to be made before said meter load disconnecting switch is operated to disconnect the meter from the load circuit, and likewise necessitating the re-switching of said meter into the load circuit before the said test appliance can be removed from the test contact.

34. Service and meter testing apparatus comprising in combination a service switch, a load circuit in electrical connection with said switch, a meter adapted to measure the power delivered to said load circuit, a meter testing circuit, a meter load disconnecting switch, said switch comprising a movable switch blade of substantially quadrantal shape and coöperating fixed contacts, a meter test contact associated with one of said fixed contacts, a peripheral flange on said switch blade substantially normal to the face thereof, said meter load disconnecting switch serving to switch said meter from said load circuit to said meter test circuit, a meter testing appliance coöperating with said meter testing contact, the said flange on said meter load disconnecting switch necessitating the interconnection of said test contact and test appliance when a meter test is to be made before said meter load disconnecting switch is operated to disconnect the meter from the load circuit, and likewise necessitating the re-switching of said meter into the load circuit before the said test appliance can be removed from the test contact, a protective inclosure for all of said apparatus and the electrical interconnecting means, said inclosure including a cover, said test apparatus being inaccessible until the cover is opened, and the return of said cover to the closed position being prevented until the said testing apparatus is removed, whereby after testing the meter, the cover of the inclosure may be closed only after the meter load disconnecting switch is in the service condition with the meter in the load circuit.

35. Service and meter testing apparatus comprising in combination, a service switch, a load circuit in electrical connection with said switch, a meter adapted to measure the power delivered to said load circuit, a meter testing circuit, a meter load disconnecting switch, said switch comprising a movable switch blade of substantially quadrantal shape and coöperating fixed contacts, a peripheral flange on said switch blade, a fixed meter test contact, a meter testing appliance, said flange and said test appliance coöperating to necessitate the switching of the meter into the load circuit before the test appliance can be removed from said meter test circuit.

36. Service and meter testing apparatus comprising in combination a service switch, a load circuit, a meter test circuit, a protective inclosure including a cover for said apparatus and interconnecting wiring, a meter load disconnecting switch including a movable blade contact and fixed coöperating contacts, a fixed test terminal and a movable test appliance, said meter load disconnecting switch being accessible only when said cover is open, and means associated with said movable blade coöperating with said test appliance to necessitate the operation of said meter load disconnecting switch to include the meter in the load circuit after a meter test is completed before the cover of the inclosure can be closed.

37. Service and meter testing apparatus comprising in combination a service switch, a load circuit, a meter test circuit, a meter load disconnecting switch including a movable blade contact and fixed coöperating contacts, a fixed test terminal and movable test appliance, means associated with said movable blade coöperating with said test appliance to necessitate the operation of said meter load disconnecting switch to include the meter in the load circuit after a meter test is completed before the said testing appliance can be removed from its coöperating test contact.

38. A meter load disconnecting switch comprising in combination a movable, sector shaped switching blade, stationary switch contacts coöperating therewith, and a peripheral flange on said blade substantially normal to the face of said switching blade.

39. A meter load disconnecting switch comprising in combination a movable sector shaped switch blade, stationary switch contacts coöperating therewith to obtain a make - before - break coöperation therebetween, and a peripheral flange on said blade substantially normal to the face thereof.

40. A meter load disconnecting switch, comprising in combination a movable substantially quadrantal switch blade, stationary switch contacts coöperating therewith, a peripheral flange on said blade substantially normal to the face thereof, and means for sealing or locking said switch blade in its coöperating positions with said stationary contacts.

41. In a service and meter test system, in combination, line wires, a load circuit normally including a meter, and connections between the load circuit and line wires comprising means for converting the system from normal service condition to a meter test condition, or for alternatively resuming normal conditions, or disabling the test circuit conditions by a single operation, said means having provision for operation without interrupting the continuity of current in the load circuit.

42. In a service and meter test system, in combination, line wires, a load circuit, a meter in said load circuit, a main switch for connecting the load circuit to the line wires, and a second switch independent of said main switch having provision for directing the line current through the meter to the load for service or alternatively directing the line current to the load independently of the meter and without interruption of the continuity of the current in the load circuit.

43. In a service and meter test system, in combination, line wires, a load circuit, a meter in said load circuit, a main switch for connecting the load circuit to the line wires, and a second switch arranged on the opposite side of the main switch from the line wires, having provision for diverting the line current through the meter to the load for service, or alternatively diverting the line current to the load independently of the meter.

44. In a service and meter test system, in combination, line wires, a load circuit, a meter normally in said load circuit, a main switch for connecting the load circuit to the line wires, and a second switch arranged on the opposite side of the main switch from the line wires, having provision for directing the line current through the meter to the load for service, or alternatively diverting the line current to the load independently of the meter.

45. In a service and meter test system, in combination, line wires, a load circuit, a meter in said load circuit, a main switch for connecting the load circuit to the line wires, a second switch independent of said main switch having provision for directing the line current through the meter to the load for service, or alternatively diverting the line current to the load independently of the meter, a test meter and means for temporarily including said test meter in circuit with the first said meter.

46. In a meter-testing system, the combination with a meter and a switch block having mounted thereon a service switch associated with protective devices, of an independent switching device between said meter and said service switch, said device being capable of comprising a part of an adjunctive meter-testing circuit and by-passing the meter by a single operation.

47. In a meter-testing system, the combination with a switch block, a switch of the knife-blade type being mounted on said block and having movable and stationary contacts, entrance wires being connected to one set of said contacts and load wires being connected to the other set of contacts, a circuit opening and closing device being associated with said other set of contacts, said device being capable of altering the load circuit to provide a meter-testing circuit by a single operation.

48. In a meter-testing system, the combination with a switch associated with protective devices, of a pair of contacts, another contact adapted to serve said first-mentioned contacts, the relation of said serving contact being a make-before-break one, means for establishing a meter-testing circuit, the establishment of either circuit being under the control of said serving contact.

49. In a meter-testing system, the combination with a switch associated with protective devices, an incoming service connection and an out going load connection, meter coil connections complemental to the said incoming service and out-going load connections, of means electrically joining one of said meter connections with one of the other connections, said means including a pair of contacts and another contact adapted to serve said first-mentioned contact, the relation of said serving contact being a make-before-break one, the position of said serving contact determining the functioning of a meter-testing appurtenance adapted to be associated therewith.

50. In a meter-testing system, the combination with a switch having an incoming service connection, an out-going load connection, meter coil connections complemental to said incoming service and out-going load connections, means connecting the incoming service connection with one of the meter connections, means connecting the out-going load connection with the other meter connection, protective devices associated with said switch and means coöperative with both of said connecting means to permit the testing of the meter coil and at the same time insure the continued current flow from the incoming service to the out-going load wire without disturbing the protection thereto afforded by said protective devices.

51. In a meter-testing system, the combination with a switch having an incoming service connection, an out-going load connection, meter coil connections complemental to said incoming service and out-going load connections, means connecting the incoming service connection with one of the meter connections, means connecting the out-going load connection with the other meter connection, protective devices associated with said switch, and means coöperative with one of said connectors to permit the testing of the meter coil and at the same time insure the continued current flow from the incoming service to the out-going load wire without disturbing the protection thereto afforded by said protective devices, said last-mentioned means including a pair of stationary contacts and a movable contact adapted to serve such stationary contacts, the relation of said serving contact with said stationary contacts being a make-before-break one.

52. In service and meter test apparatus, in combination, a base or supporting block, a main switch mounted thereon, auxiliary switch parts mounted on said base, load circuit terminals and line wire terminals on said base, a meter and leads for normally connecting said meter in circuit with said load circuit terminals, said auxiliary switch parts comprising means on the opposite side of said main switch from said line wires for shunting the current from said meter direct to said load circuit terminals, while maintaining a closed circuit to the latter.

53. In combination, service leads, a load circuit, and interconnections therebetween comprising a connector or switching element in each service lead, said elements being operable in unison, a meter coil, a load-controlling switch interposed between said meter coil and load circuit, the said controlling switch being operable independently of said switching elements and capable of carrying and interrupting all the current flowing in the load circuit, and a protective inclosure for said switch elements and said controlling switch.

54. In combination, service leads, a load circuit, and interconections therebetween comprising a service switch, a meter adapted to measure the power transmitted to said load circuit, a meter load disconnecting switch intermediate said meter and said load circuit operable independently of said service switch and capable of interrupting all the current flowing in the load circuit, said switch also operating to disconnect the meter from the load circuit so that said meter may be calibrated, and a protective inclosure for said service switch and said disconnecting switch.

In witness whereof, I have hereunto set my hand the 25th day of March, 1919.

BRYSON D. HORTON.

---

Corrections in Letters Patent No. 1,338,180.

It is hereby certified that in Letters Patent No. 1,338,180, granted April 27, 1920, upon the application of Bryson D. Horton, of Detroit, Michigan, for an improvement in "Service and Meter-Test Systems and Associated Apparatus," errors appear in the printed specification requiring correction as follows: Page 1, line 17, strike out the words "and adequate together with" and insert the words *together with adequate and;* page 3, line 68, for the word "connection" read *connections;* page 17, line 35, claim 54, for the word "interconections" read *interconnections;* and that the said Letters Patent should be read with these corrections therein that the same may conform to the record of the case in the Patent Office.

Signed and sealed this 8th day of June, A. D., 1920.

[SEAL.]

M. H. COULSTON,

*Acting Commissioner of Patents.*

Cl. 175—183.